United States Patent
Donahue

(10) Patent No.: US 7,577,739 B2
(45) Date of Patent: *Aug. 18, 2009

(54) EMPLOYEE INTERNET MANAGEMENT DEVICE

(75) Inventor: Thomas P. Donahue, Littleton, CO (US)

(73) Assignee: Vericept Corporation, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/951,848

(22) Filed: Dec. 6, 2007

(65) Prior Publication Data

US 2008/0133745 A1 Jun. 5, 2008

Related U.S. Application Data

(63) Continuation of application No. 09/759,089, filed on Jan. 11, 2001, now Pat. No. 7,315,891.

(60) Provisional application No. 60/175,937, filed on Jan. 12, 2000.

(51) Int. Cl.
G06F 15/173 (2006.01)
G06F 17/00 (2006.01)

(52) U.S. Cl. .............................. 709/224; 726/13; 726/22

(58) Field of Classification Search ................. 709/224; 726/11–13, 22
See application file for complete search history.

(56) References Cited

U.S. PATENT DOCUMENTS

| | | | |
|---|---|---|---|
| 5,371,807 A | 12/1994 | Register et al. | |
| 5,541,836 A | 7/1996 | Church et al. | |
| 5,796,942 A | 8/1998 | Esbensen | |
| 5,796,948 A | 8/1998 | Cohen et al. | |
| 5,832,212 A * | 11/1998 | Cragun et al. ................... 726/2 |
| 5,835,722 A | 11/1998 | Bradshaw et al. | |
| 5,850,388 A | 12/1998 | Anderson et al. | |
| 5,870,559 A * | 2/1999 | Leshem et al. ............... 709/224 |
| 5,878,423 A | 3/1999 | Anderson et al. | |
| 5,884,033 A | 3/1999 | Duvall et al. | |
| 5,887,120 A | 3/1999 | Wical | |
| 5,930,788 A | 7/1999 | Wical | |
| 5,978,568 A | 11/1999 | Abraham et al. | |
| 5,983,214 A | 11/1999 | Lang et al. | |
| 5,983,270 A | 11/1999 | Abraham et al. | |
| 5,996,011 A | 11/1999 | Humes | |
| 6,061,675 A | 5/2000 | Wical | |
| 6,119,236 A | 9/2000 | Shipley | |
| 6,148,336 A | 11/2000 | Thomas et al. | |
| 6,266,664 B1 * | 7/2001 | Russell-Falla et al. ......... 707/5 |

(Continued)

OTHER PUBLICATIONS

Ranum, et al. "Implementing a Generalized Tool for Network Monitoring" 1997 Lisa XI; Oct. 1997; www.usenix.org; pp. 1-9; San Diego, CA.

Primary Examiner—David Lazaro
(74) Attorney, Agent, or Firm—Hogan & Hartson LLP

(57) ABSTRACT

A system for monitoring and maintaining an acceptable use policy for network communications monitors, stores and searches for the presence of preselected regular expressions, either by subject category or by keywords. The regular expressions within the subject categories are assigned predetermined values, either negative or positive. If a communication contains regular expressions whose sum of weighted values exceeds a threshold value, the communication is stored for subsequent review by an authorized user of the system. If the communication contains keywords selected by the authorized user, the communication is also stored for subsequent review.

44 Claims, 2 Drawing Sheets

U.S. PATENT DOCUMENTS

| | | |
|---|---|---|
| 6,336,117 B1 | 1/2002 | Massarani |
| 6,366,910 B1 | 4/2002 | Rajaraman et al. |
| 6,381,632 B1 | 4/2002 | Lowell |
| 6,438,632 B1 | 8/2002 | Kikugawa |
| 6,446,119 B1 | 9/2002 | Olah |
| 6,453,345 B2 | 9/2002 | Trcka et al. |
| 6,477,551 B1 | 11/2002 | Johnson et al. |
| 6,539,375 B2 | 3/2003 | Kawasaki |
| 6,633,855 B1 | 10/2003 | Auvenshine |
| 7,016,951 B1 | 3/2006 | Longworth et al. |
| 7,315,891 B2 * | 1/2008 | Donahue .................... 709/224 |

* cited by examiner

EMPLOYEE INTERNET MANAGEMENT DEVICE

RELATED APPLICATIONS

The present application is a continuation of U.S. patent application Ser. No. 09/759,089 filed Jan. 11, 2001, (now U.S. Pat. No. 7,315,891) which claims priority of U.S. Provisional Application No. 60/175,937 filed Jan. 12, 2000, both applications being incorporated herein in their entireties by this reference.

FIELD OF THE INVENTION

The present invention relates to the field of employee Internet and network management. More specifically, it relates to a device and method for employers to monitor and maintain employee compliance with an organization's acceptable use policy relating to network usage.

BACKGROUND OF THE INVENTION

As more and more businesses connect to the Internet, employee misuse of company computers and networks is increasing and, perhaps, reaching epidemic proportions. As a result, employee productivity is often significantly reduced. Moreover, the threat of lawsuits against the company is increased due to increased potential for inappropriate or illegal use of the network.

Unfortunately, there are very few products available for use by managers to monitor network use by employees, whether the network is a local area network or a wide area network such as the Internet, and report on violations of corporate policy. Instead, rather than allow monitoring of network use, most products attempt to block access to web sites that are deemed non-business-related sites. However, such products are largely ineffective, regularly allowing access to non-business-related sites, as well as erroneously blocking access to legitimate business-related sites. Most of these products compile databases of web uniform resource locators (URLs) that are deemed inappropriate. There are many problems with this approach. First, it addresses only web access, ignoring email, chat sessions, and similar communications. Second, the Internet is growing too rapidly to maintain an effective database of inappropriate sites. As soon as a new database update is released, it is already hopelessly out of date. Third, the size of the database must be proportional to the size of the Internet. Given the Internet's rapid and unlimited growth, no database approach can scale well enough to use in the long term. Fourth, the selection of appropriate versus inappropriate URLs is made by the manufacturer of the product. This reduces the manager's ability to tailor the database to reflect individual corporate needs.

Alternatively, a few products use lists of keywords rather than a URL database to monitor employee activity. These have the advantage of scaling well and enabling managers to customize web access rules that more accurately reflect corporate policy. However, most products use a simplistic implementation of keyword searching, resulting in nearly as many errors as with the URL database approach. For example, a legitimate medical site may be incorrectly identified as pornographic because of references to human genitalia.

SUMMARY OF THE INVENTION

The present invention utilizes a method of weighted regular expressions to perform language analysis, categorize the monitored data and report deviations from a company's acceptable use policy. The present invention monitors all Transport Control Protocol/Internet Protocol (TCP/IP) network communications. It is not limited to just web or email monitoring. It stores any TCP/IP sessions that match the criteria selected by the user from either predefined categories or user defined keywords. The stored sessions can then be viewed, downloaded, and/or deleted by the user.

The search criteria are selected in two ways, by subject category or by keyword matching. Categories are pre-defined topics, such as "conflict," "resignation," or "shopping." The user can select whether the category should be on or off. If on, a sensitivity is selected by the user. Sensitivity levels are inversely proportional to the amount of category-related language required to indicate a match. For example, a low sensitivity requires more category-related language than a high sensitivity to qualify as a match. In addition, some categories are hierarchical, containing no regular expressions but depend upon matches by constituent categories. For instance, a "disgruntled" hierarchal category would generate a match if there were enough matches in its constituent categories, such as "resignation" and "conflict." A further hierarchal category, such as "work place violence," could generate a match if matches are generated in the "disgruntled" category and in a "weapons" category. The keywords are user-defined. The user can select whether any of the keywords or all of the keywords are required for a match. This is similar to the simple keyword matching used as the foundation of most keyword-based network monitoring products.

BEST MODE FOR CARRYING OUT THE INVENTION

The hardware for implementing the present invention consists of a PC-compatible embedded-system that boots from flash ram and uses a hard disk for storing monitored data. A Linux operating system kernel and associated utilities, as well as proprietary software, are stored on the flash ram. The proprietary software allows for monitoring and storing raw TCP/IP data, for searching the raw data for the user-selected criterion and for providing a user interface via an integrated web server.

During monitoring and storing, the program listens to the Ethernet interface in promiscuous mode, storing each TCP/IP half-session to its own file or log on disk.

Figure 1:
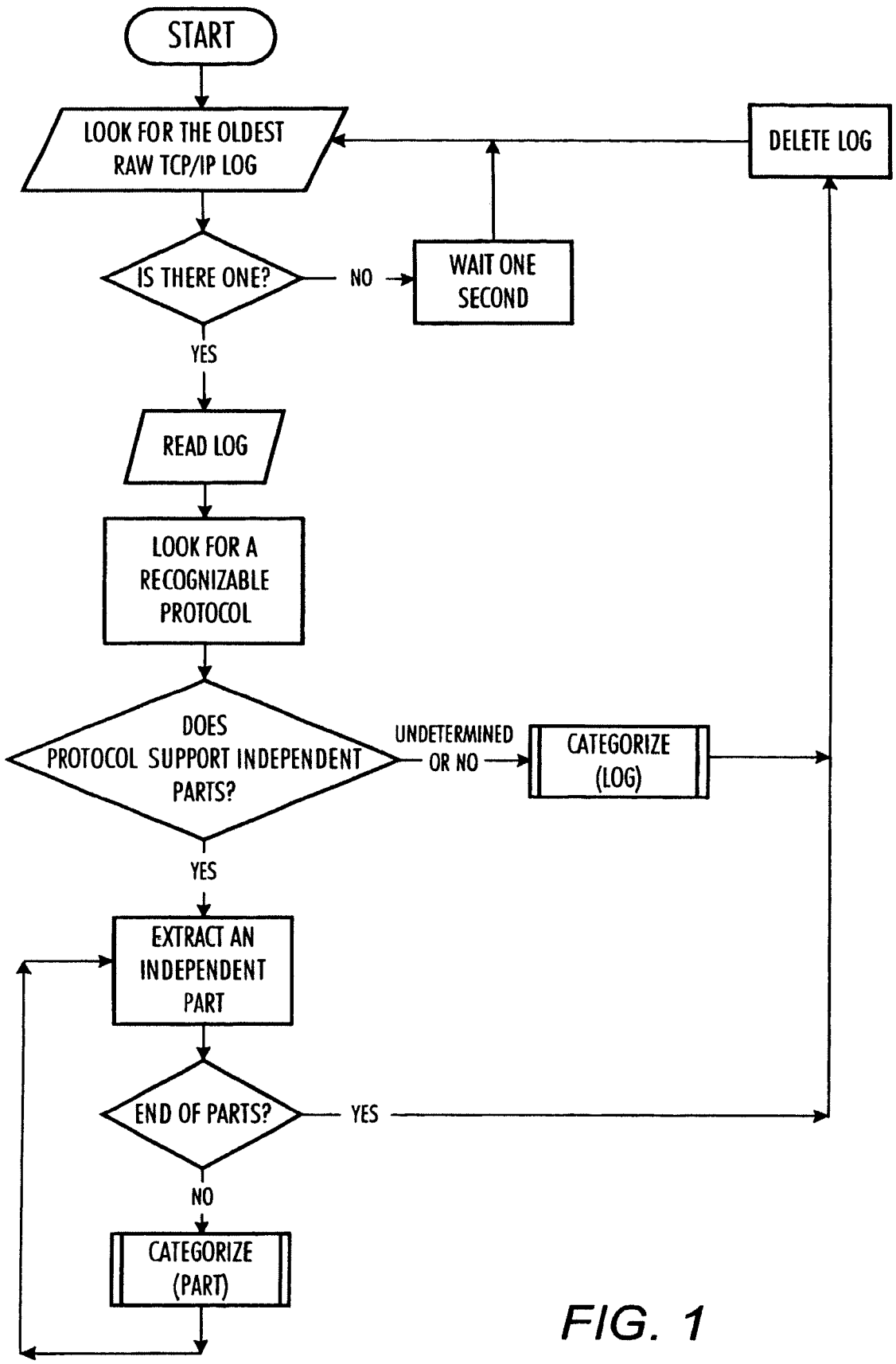
FIG. 1 is a flow diagram that describes how unprocessed logs or data, compiled by the present invention, are initially analyzed.

Next, the stored logs are processed by a separate program. FIG. 1 is a flow diagram which illustrates this processing. More specifically, it is desirable for the logs to be processed in roughly first in first out (FIFO) order. Therefore, the process always tries to read the oldest currently available log. If no logs are present, the process waits briefly, and tries again.

When a log has been successfully read, it is first examined to determine if it conforms to a known protocol. Unknown protocols will also be processed. However, the analysis and reporting process can be enhanced for certain types of data, if the protocol is known. This protocol identification is accomplished by comparing the log data with known protocol patterns. If no pattern is discernible, the source and destination tcp port numbers are examined. If a well-known port number under 1024 is used, the data is assumed to be of the protocol associated with the tcp port. For example, the simple mail transport protocol (SMTP) can usually be identified by patterns within the data stream. However, if part of the data is missing, it may no longer be identifiable in this manner. But the number of either the source or destination tcp port will be 25. Because SMTP always uses tcp port 25, the log data can be assumed to be part of an SMTP session.

Some protocols transfer multiple independent data streams within a single tcp session. For example the SMTP protocol supports the transmission of multiple unrelated emails in one tcp session. If the log data is identified as being associated with one of these protocols, each independent part of the log is processed individually. Even these independent portions of the log may need to be broken down further into smaller pieces. For instance, email may contain multiple documents in the form of attachments, which may need to be converted, where possible, to a format containing text, and analyzed separately.

Figure 2:
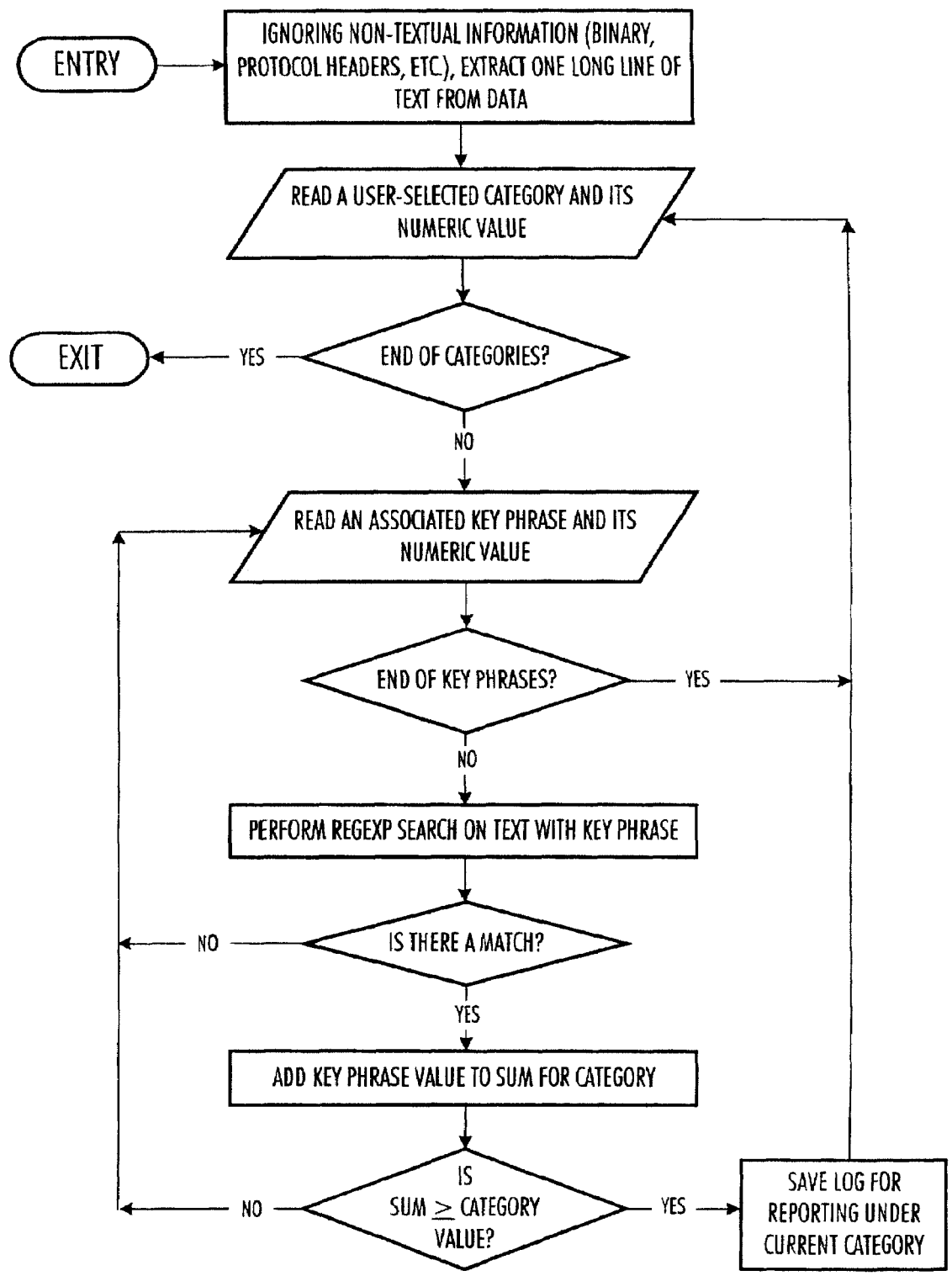
FIG. 2 is a flow diagram that describes how the data is further processed to determine if it meets selected search criteria.

Each log, or independent portion of the log is then processed by the "categorize" subroutine which is illustrated in the flow diagram of FIG. 2. First, the data is stripped of any content which does not appear to contain language elements. The remainder, i.e., text containing language elements, is stored as a string of language elements separated by spaces. This allows the language elements or text to be effectively searched regardless of its original formatting. In example 1, addressed below, an email message is processed. Note that in email, quotation of prior email references are commonly preceded by numerous "greater than signs" (>), which are stripped in this step.

The text is then searched to determine whether it matches the current set of user-selected criteria. If so, the log is saved in a separate file system in one or more subdirectories based on which criteria were matched. Then the log is deleted.

The criteria matching process is based on weighted key phrases or regular expressions. All key phrases take advantage of the "regular expressions" used in common Unix utilities such as egrep, sed, and perl. This enables the use of extremely flexible and powerful key phrases. Each category is assigned a numeric value. Each key phrase or regular expression within a category is also assigned a numeric value. When a log is examined, the sum of all values associated with each matching key phrase or regular expression is compared with the value for the category. If the sum meets or exceeds the category value, the file is considered a match for that category.

This process is different from simple keyword matching in that many individual key phrases can be matched, without necessarily causing a match for the category. It also enables matching based on a sufficient amount of questionable language content, the constituent key phrases of which might be completely innocuous individually.

Within each category, a regular expression can be assigned a positive or negative value. Using negative values facilitates avoidance of "false hits", or undesired matches. For example, in the medical web site example noted above, a legitimate web site would not necessarily produce a match for pornography if medical terms were assigned negative values and included in the key phrases within the pornography category. As another example, often web-based news reports will contain language related to sports. Assume that a company wants to log sports-related activities, but doesn't want to log common news reports. This can be accomplished by assigning negative values to news-related key phrases and including these in the key phrase lists within sports. Much more sports language would then be required to trigger a match within a log containing news reports. This technique can be applied to any content that regularly produces false hits, effectively reducing a category's sensitivity level automatically whenever appropriate.

For example, the following is a category definition for a category relating to mergers and acquisitions:

```
acquisition (threshold = 4)
# resignation/recruiting
-4 resume (attached\enclosed)
-4 \b(his\her\your\my\a\the\attached\enclosed) resume
-4 resume [ ]*\.(doc\rtf\html)
# News
-4 (top\frontpage\headline) (news\stor)
-4 today\'s headlines
-4 \(reuters\)
-4 \(ap\)
-4 \(upi\)
-2 edition
-2 \bnewsletter\b
-2 \bnews\b
-1 weekly
4 (buy\sell) (\w+\) company
4 buyout
3 due diligence
2 stock (trade\shares)
2 merger
2 equity
2 \bipo\b
2 stock option
1 \bacqui[rs]
1 contract(\s\ed\ing)\b
1 synergy
```

This category will find matches on merger/acquisition related activity. Note that any resignation or news related language will reduce the sensitivity, requiring additional merger/acquisition language to trigger a match. The log is searched for the weighted regular expressions in the order defined by the category definition. Thus, with respect to the acquisition category, the regular expression "resume (attached/enclosed)" will be searched first and the remainder of the weighted regular expressions will be searched in the order shown. Once a category's threshold value is met or exceeded, in this case 4, the search is stopped and the log is saved.

The following two examples show how logs are processed utilizing the categorize subroutine depicted in FIG. 2. The first example involves e-mail communications involving at least one employee and the second example relates to a web page located by an employee search.

EXAMPLE 1—AN EMAIL

```
MAIL From:<johndoe@company-a.net> SIZE=4414
RCPT TO:<janedoe@company-b.com>
DATA
Received: from xyz.com ([10.74.91.90])
    by some.mailserver.net (InterMail v03.02.03 118 118 102)
    with ESMTP
    id <19980924014702.FEMX9555@xyz.com>
    for <janedoe@company-b.com>; Thu, 24 Sep 1998 01:47:02
+0000
    From: "John Doe"<johndoe@company-a.net>
    To: "Jane Doe"<janedoe@company-b.com>
    Subject: Re: Harry's Resume
    Date: Wed, 23 Sep 1998 19:46:24 –0600
    X-MSMail-Priority: Normal
    X-Priority: 3
    X-Mailer: Microsoft Internet Mail 4.70.1161
```

-continued

```
MIME-Version: 1.0
Content-Type: text/plain; charset=ISO-8859-1
Content-Transfer-Encoding: 8bit
Message-Id:<19980924014702.FEMX955S@blah.blah.blah.com>
Jane,
The stock options would become fully vested upon any corporate
merger or acquisition.
John,
>>John,
>>
>>The 5 year vesting period seems a bit long. Harry was
wondering what, if anything, would happen upon change of control.
>>
>>Jane,
>>>Jane,
>>>
>>>Harry's resume looks fine. I'll pass it on to the VP of Sales.
>>>
>>>Thanks,
>>>John
>>>>John,
>>>>
>>>>I think I found a good candidate for you. The attached
>>>>resume is from Harry Smith. He's interested in the
>>>>Colorado Sales Director position.
>>>>
>>>>Jane
```

Using the category definition defined above, the first match is on the text "attached resume" by the regular expression "\b(his|her|your|my|a|the|attached|enclosed)resume". Note that the email actually contains the lines:

```
>>>>I think I found a good candidate for you. The attached
>>>>resume is from Harry Smith. He's interested in the
```

The first thing that the categorize subroutine does (refer to flow chart) is to extract only language elements, therefore the common email quote characters, ">>>>", are not part of the text line that is searched. This match results in the sum being set to −4 because the term "resume" is assigned a weight of −4. Because the sum is not greater than or equal to 4 (the value for this category), the search continues. The next match is on the text "merger" by the regular expression "merger". The sum is updated to −2 because the term "merger" is assigned a weight of +2. Because sum is not greater than or equal to 4, the search continues. The next match is on the text "stock options" by the regular expression "stock option". The sum is updated to zero because the term "stock option" is assigned a weight of +2. Because the sum is not greater than or equal to 4, the search continues. The next match is on the text "acquisition" by the regular expression ".\bacqui[rs]". The sum is updated to 1 because the weight assigned to this term is +1. Because sum is not greater than or equal to 4, the search continues. But, there are no more matches. Therefore, the text is not considered a match for this category and the log is deleted.

EXAMPLE 2—A WEB-PAGE

```
<BASE HREF="http://www.mnanews.com/daily/">
<HTML>
<HEAD>
<TITLE>
Smart Buyers' News: Tech Stocks Fueling Merger, Acquisition Activity
</TITLE>
</HEAD>
</HEAD>
<body background="http://img.mnanews.com/images2/ebnback3.gif"
bgcolor="#FFFFFF" link="#0000FF" alink="#0000FF" vlink="#0000FF"
text="#XXXXXX" rightmargin="0" leftmargin="0" topmargin="0"
marginheight="0" marginwidth ="0">
<!--TITLE
-->
<!-- MAIN CONTENT AREA: INSERT ONE BLOCK OR A TWO-COL
NESTED TABLE -->
<!-- SITE LOGO -->
<img width="350" src="http://stuff.com/images/logo.gif"
height="93"alt="Smart Buyers' News">
<!-- STORY GOES HERE -->
<h2>
Tech Stocks Fueling Merger, Acquisition Activity
</h2>
(7:00 p.m. EST, 1/21/98)
<br>
<i>By
<a href="mailto:johndoe@mycorp.com">John Doe
</a></i>
<p>The stock market's ongoing volatility is a key ingredient fueling the
surging merger and acquisition activity among technology companies,
according to a report released Wednesday by the New York investment
firm Jane Doe & Associates.
<p>The total number of merger/acquisition transactions in the information
technology, media and communications industries climbed to new levels
last year, increasing 25% globally and 31% in North America, according to
Bro adview Associates' 1997 Technology M&A Report. Worldwide number
of merger and acquisition (M&A) transactions in the technology industry
```

-continued

```
reached a record 4,040 in 1997, 25% more than the 3,224 transactions
completed in 1996, according to Broadview, a leading mergers and
acquisitions investment bank serving the IT, media and communications
industries.
<p>--The number of corporate buyouts jumped 57% in 1997; in the
software sector, the number of public sellers leaped 83%.
</BODY>
</HTML>
```

The first match is on the text "News:" by the regular expression "\bnews\b". The sum is set to −2 because the term has an assigned weight of −2. Because the sum is not greater than or equal to 4, the search continues. The next match is on the text "buyouts" by the regular expression "buyout". The sum is updated to 2 because the term has an assigned weight of +4. Because the sum is not greater than or equal to 4, the search continues. The next match is on the test "Merger" by the regular expression "merger." The sum is updated to 4 because this term has an assigned weight of +2. Because sum is greater than or equal to 4, the log is saved and the search is finished for this category.

Through the use of common gateway interface (CGI) scripts, all reporting and maintenance is accomplished via a Web interface. To enhance ease-of-use, reports come in a number of different formats including, for example, reports based upon an individual employee or address and further showing, in bar graph format, the number of matches in each category. In addition, all bar graph segments are html links to more detailed reports, enabling the user to "drill down" via a graphical web interface. Moreover, the log viewer CGI script is capable of presenting a variety of data formats in an easy-to-read format to the user. For instance, a logged web page will be shown to the user as a web page, rather than as raw html. A logged binary print file in the HP PCL format will be displayed as text, rather than an illegible jumble of characters. Thus, the user will find stored data easy to understand.

The foregoing description of the invention relates to the best mode of practicing the invention known to the inventor at the time of filing this application. Alternatives will likely be recognized by those skilled in the art following a review of this patent. Such modifications or alternative approaches, recognized by those skilled in the art, are deemed to be part of this disclosure and within the scope of the present invention.

I claim:

1. In a computer network, a computer system for maintaining an acceptable use policy, the computer system comprising:
    a machine capable of executing instructions embodied as software; and
    a plurality of software portions comprising
        one of said software portions is configured to receive input from a user selecting a subject matter category for use in monitoring network communications;
        one of said software portions is configured to monitor TCP/IP network communications;
        one of said software portions is configured to store raw TCP/IP session data of said TCP/IP network communications in a log of logged data;
        one of said software portions is configured to test the logged data for the presence of at least one preselected criterion, wherein the preselected criterion is defined by a user, comprises two or more subject matter categories each comprising regular expressions, with a first portion of said regular expressions assigned weights with negative values and a second portion of said regular expressions assigned weights with positive values, wherein the logged data is tested for the presence of the at least one preselected criterion and wherein said testing first tests the logged data for the presence of the negative valued regular expressions;
        one of said software portions is configured to maintain a sum of values associated with said regular expressions found within at least one subject matter category as each regular expression is found by said testing by adding the value of the found regular expression to the sum of values;
        one of said software portions is configured to delete the logged data when the presence of said at least one preselected criterion is not determined; and
        one of said software portions is configured to store the logged data and halt the testing when the sum of values associated with said regular expressions within a category meets or exceeds a positive threshold value selected based on user input.

2. The method of claim 1, further comprising a software portion configured to prioritize the order in which regular expressions within a subject matter category are tested.

3. The method of claim 2, wherein said prioritizing software portion reduces the likelihood of false hits.

4. The method of claim 1, wherein the presence of the preselected criterion in at least one of said categories comprises a match in a plurality of categories.

5. The method of claim 1, wherein said subject matter categories comprise key words.

6. The method of claim 1, wherein the threshold value of at least one subject matter category comprises equaling or exceeding the threshold value in a plurality of subject matter categories.

7. The method of claim 6, wherein said threshold values assigned to said subject matter categories are variable.

8. The method of claim 1, wherein said subject matter categories have a hierarchical relationship.

9. The method of claim 8 wherein said hierarchical relationship comprises defining the threshold value for at least one subject matter category as the presence of predetermined expressions in a plurality of other subject matter categories.

10. The method of claim 8, wherein said hierarchical relationship comprises defining the threshold value for at least one subject matter category as matching or exceeding the threshold value assigned to a plurality of other subject matter categories.

11. The method of claim 1, further comprising a software portion configured to output a report relating to the presence of said at least one preselected criterion.

12. The method of claim 11, wherein said report identifies individuals whose use of the computer network included communications which matched preselected criterion.

13. The method of claim 11, wherein said report identifies network addresses where communications were received or originated that included matched preselected criterion.

14. The method of claim 11, wherein said report provides the text of all communications that match said preselected criterion.

15. The method of claim 11, wherein said report is in a human readable format and at least a portion of the stored communications is provided in the report in a form matching that generated or viewed during the monitored TCP/IP network communications.

16. The method of claim 1, further comprising a software portion configured to output a report relating to the presence of preselected criterion, wherein said report identifies the number of matches in a category.

17. The method of claim 16, wherein said report is in a graphical format and at least a portion of the stored communications is displayed in a user interface in a form matching that generated or viewed during the monitored TCP/IP network communications.

18. The method of claim 1 further comprising:
a software portion configured to attempt to identify a protocol by comparing the stored TCP/IP network communications with known protocol patterns, wherein when the attempting results in one of the known protocol patterns being identified, the testing of the stored communications involves testing of each independent part of the stored TCP/IP network communications associated with the identified one of the known protocol patterns.

19. The method of claim 1 wherein the weights are counts of matches of regular expressions.

20. The method of claim 1 wherein the weights are counts of the matches of strings.

21. A computer system for implementing a method for monitoring and maintaining an acceptable use policy for computer network usage, the computer system comprising:
a machine capable of executing instructions embodied as software; and
a plurality of software portions in which
one of said software portions is configured to capture data on a network, wherein the data comprises multiple half sessions of TCP/IP network communications;
one of said software portions is configured to remove data content that does not contain language elements;
one of said software portions is configured to test the remaining content for the presence of predetermined expressions, wherein the predetermined expressions comprise two or more categories each containing predetermined expressions that are defined by a user and are weighted with positive and negative values, wherein said testing first tests the remaining content for the presence of the negative valued predetermined expressions;
one of said software portions is configured to maintain a sum of values associated with said predetermined expressions found within at least one category as each predetermined expression is found by said testing by adding the value of the found predetermined expression to the sum of values; and
one of said software portions is configured to store the remaining data and halt the testing when the sum of values associated with said predetermined expressions within a category meets or exceeds a positive threshold value selected based on user input, wherein at least one stored half session comprises a plurality of independent parts, and the testing is performed individually on each independent part.

22. The method of claim 21, wherein said negative and positive valued regular expressions are separately tested in the order of largest value to smallest value.

23. The method of claim 21, wherein said expressions include regular expressions.

24. The method of claim 21, wherein the threshold value for at least one category comprises meeting or exceeding the threshold value for a plurality of other categories.

25. The method of claim 21, wherein the threshold value of at least one category comprises meeting or exceeding the threshold value for at least one other category and not meeting or exceeding the threshold value for at least another category.

26. The method of claim 21, wherein said threshold value for a category is variable.

27. The method of claim 21, further comprising a software portion configured to output a report relating to the presence of predetermined expressions.

28. The method of claim 27, wherein said report identifies individuals whose use of the computer network included communications which matched predetermined expressions.

29. The method of claim 27, wherein said report identifies network addresses where communications were received or originated that included matched predetermined expressions.

30. The method of claim 21, further comprising a software portion configured to output a report relating to the presence of predetermined expressions, wherein said report identifies the number of matches in a category.

31. The method of claim 30, wherein said report is in a graphical format and at least a portion of the stored communications is displayed in a user interface in a form matching that generated or viewed during the monitored TCP/IP network communications.

32. The method of claim 30, wherein said report provides the text of all communications that match said predetermined expressions.

33. The method of claim 30, wherein said report is in a human readable format and at least a portion of the stored communications is provided in the report in a form matching that generated or viewed during the monitored TCP/IP network communications.

34. The method of claim 21 wherein the weights are counts of matches of regular expressions.

35. The method of claim 21 wherein the weights are counts of the matches of strings.

36. In a computer network, a computer system for implementing a method for maintaining an acceptable use policy the computer system comprising:
a machine capable of executing instructions embodied as software; and
a plurality of software portions comprising
one of said software portions is configured to receive input from a user selecting a subject matter category for use in monitoring logged network data containing language elements;
one of said software portions is configured to test the language elements of the network data for the presence of at least one preselected criterion, wherein the preselected criterion is defined by a user, comprises two or more subject matter categories each comprising regular expressions, with a first portion of said regular expressions assigned weights with negative values and a second portion of said regular expressions assigned weights with positive values, wherein the language elements of the network data are tested for the presence of the at least one preselected criterion and wherein said testing first tests the language elements of the network data for the presence of the negative valued regular expressions to facilitate avoidance of false hits;

one of said software portions is configured to maintain a sum of values associated with said regular expressions found within at least one subject matter category as each regular expression is found by said testing by adding the value of the found regular expression to the sum of values; and one of said software portions is configured to store the network data for subsequent action selected from the group consisting of reporting, viewing, downloading and deleting when the sum of values associated with said regular expressions within a category meets or exceeds a positive threshold value selected based on user input.

37. The method of claim 36, wherein said computer network is a wide area network.

38. The method of claim 36, wherein said computer network is a local area network.

39. The method of claim 36, further comprising a software portion configured to output a report relating to the presence of predetermined expressions whose sum meets or exceeds the threshold value of a category.

40. The method of claim 39, wherein said report identifies individuals whose use of the computer network included communications which contained predetermined expressions whose sum matched or exceeded the threshold value of at least one category.

41. The method of claim 39, wherein said report identifies network addresses where communications were received or originated that included predetermined expressions whose sum matched or exceeded the threshold value of at least one category.

42. The method of claim 39, wherein said report is in a graphical format and at least a portion of the network data is displayed.

43. The method of claim 36 wherein the weights are counts of matches of regular expressions.

44. The method of claim 36 wherein the weights are counts of the matches of strings.

* * * * *